United States Patent [19]

Baker

[11] Patent Number: 4,693,504

[45] Date of Patent: Sep. 15, 1987

[54] PICK-UP DEVICE FOR LAWN DEBRIS

[75] Inventor: Anna M. Baker, Lunenburg, Mass.

[73] Assignees: Kenneth R. Baker, Lunenburg; Paul G. Derosier, Westminster, both of Mass.

[21] Appl. No.: 1,170

[22] Filed: Jan. 7, 1987

Related U.S. Application Data

[63] Continuation of Ser. No. 759,405, Jul. 26, 1985, abandoned.

[51] Int. Cl.$^4$ .................. B65D 75/00; B65F 1/12
[52] U.S. Cl. .................. 294/1.1; 15/257.1; 150/49; 294/152
[58] Field of Search .............. 294/1.1, 15, 55, 74, 294/77, 137, 149, 151, 152, 156; 5/82 R, 89; 15/104.8, 257.1, 257.3, 257.6, 257.7; 53/390; 141/108, 109, 331, 337, 390, 391; 150/48-52 R; 193/25 R, 25 A; 248/94, 95, 97, 99

[56] References Cited

U.S. PATENT DOCUMENTS

| | | | |
|---|---|---|---|
| 864,408 | 8/1907 | Campbell | 193/25 A |
| 1,222,973 | 4/1917 | Morter | 294/15 |
| 1,521,184 | 12/1924 | Holton | 150/48 |
| 2,397,433 | 3/1946 | Reeves | 294/156 |
| 2,564,907 | 8/1951 | Krummel | 294/1.1 |
| 4,209,116 | 6/1980 | Hendricks | 294/152 |
| 4,434,829 | 3/1984 | Barnard | 294/1.1 X |
| 4,519,183 | 5/1985 | Parody | 294/1.1 X |

Primary Examiner—Johnny D. Cherry

[57] ABSTRACT

A carrier for particulate material, comprising a pair of elongated rigid bars which are attached to opposite side edges of a sheet of planar flexible material. The dimension of one end edge of the sheet of flexible material is substantially less than the opposite end edge thereof, so that when the carrier is in the fully extended position, so that all elements lie in the same plane, the two rigid bars taper toward each other from the wide end of the sheet to the narrow end of the sheet.

4 Claims, 3 Drawing Figures

PICK-UP DEVICE FOR LAWN DEBRIS

This is a continuation of co-pending application Ser. No. 759,405 filed on July 26, 1985, now abandoned.

BACKGROUND OF THE INVENTION

The present invention is directed to a device for picking up lawn debris, such as leaves, grass clippings, twigs, and other similar particulate materials.

One of the conventional means of removing debris from lawns, such as leaves is with the use of a blanket, tarpaulin, or other large cloth. The leaves or other debris are raked into a pile and then raked onto the cloth. However, it is difficult to pick up the cloth after the debris has been raked onto it. It is even more difficult to carry the debris filled cloth to a disposal site. In addition, it is difficult to prevent debris from spilling away from the cloth while it is being carried. Also, a cloth is totally useless for transferring the debris to a trash receptacle, such as a trash bucket or a trash bag.

Sling-type carriers have been devised for picking up lawn debris. These carriers include a pair of rigid bars which are connected to opposite ends of a length of flexible sheet material, such as cloth. The bars provide a firm grip which makes it easier to pick up and carry the lawn debris. However, the prior art carriers are not totally effective in preventing debris from spilling out of the carrier during transporting of the debris. In addition, the debris can not be transferred to a trash receptacle without spilling a substantial portion of the debris. These and other difficulties experienced with the prior art devices have been obviated in a novel manner by the present invention.

It is, therefore, a principle object of the invention to provide a pick-up device for lawn debris which enables the debris to be transferred to a trash receptacle without substantial spilling of the debris.

Another object of the invention is the provision of a pick-up device for lawn debris which enables the debris to be carried without substantial spilling of the debris from the carrier.

A further object of the present invention is the provision of a pick-up device for lawn debris which is simple in construction, which is inexpensive to manufacture, and which is easy to use.

With these and other objects in view, as will be apparent to those skilled in the art, the invention resides in the combination of parts set forth in the specification and covered by the claims appended hereto.

SUMMARY OF THE INVENTION

A carrier for particulate material, comprising a pair of elongated rigid bars which are connected to opposite side edges of a sheet of planar flexible material. One end of the sheet has a larger dimension than the opposite end, so that the side edges of the sheet taper from one end to the other.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 2:
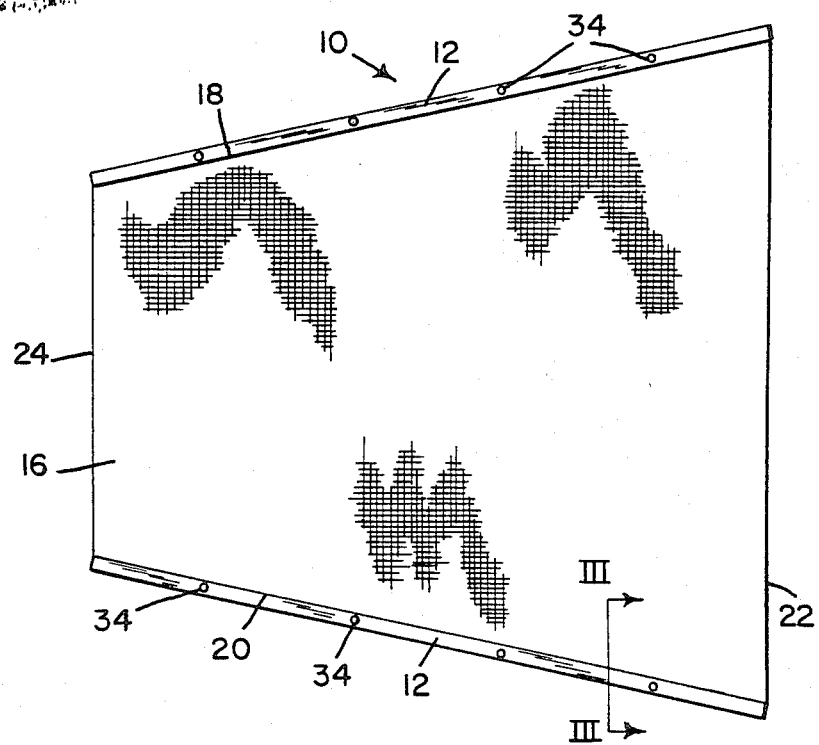
FIG. 2 is a plan view of the carrier.

Referring to the drawings, the carrier of the present invention is generally indicated by the reference numeral 10 and consists of a pair of rigid bars 12 which are connected to the opposite side edges 18 and 20 of a sheet of planar flexible material 16. The flexible sheet 16 can be any flexible material, such as fabric, screening, or plastic. However, a heavy duty woven fabric is the preferred material due to its high degree of flexiblity, durablity, and frictional characteristics relative to typical lawn debris, such as leaves, grass clippings, and twigs. The frictional characteristics are sufficiently high to enable the lawn debris to be picked up and held, but not so high as to inhibit release of the debris when transferring the debris from the carrier to a trash container. The sheet 16 has a first end edge 22 and a second end edge 24. The dimension of the second end edge 24 is substantially less than the first end edge 22, so that the rigid bars 12 taper toward each other from the end edge 22 to the end edge 24 when the carrier is layed flat, so that the sheet 16 and bars 12 occupy the same plane as shown in FIG. 2.

Figure 3:
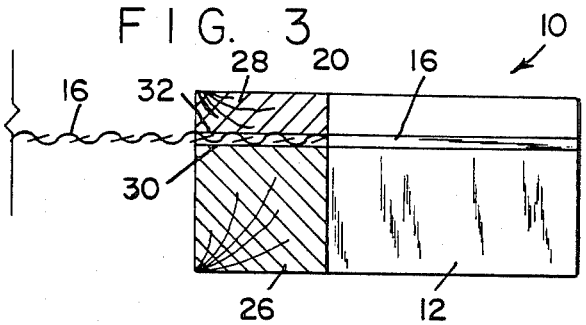
FIG. 3 is a vertical sectional view of the carrier, taken on the line III—III of FIG. 2.

Referring particularly to FIG. 3, each of the bars 12 comprises a first longitudinal portion 26 and a second longitudinal portion 28. Portions 26 and 28 have complementary flat surfaces 30 and 32, respectively, which are adapted to clamp therebetween a side edge of the sheet 16 when the portions 26 and 28 are fastened together by fastening means such as nails or screws 34. The bars 12 can be made out of any rigid material such as wood, plastic, or metal. However, wood is preferred because of its relative inexpensiveness and ease of assembly.

The operation and advantages of the present invention will now be readily understood in view of the above description. The carrier 10 is used by first grasping the bars 12, one in each hand, holding the carrier so that the wide end edge 22 is up and the narrow end edge 24 is down. The individual then places the carrier on top of a pile of lawn debris, so that the wide end edge 22 is away from the individual and the rigid bars 12 are then pushed down into the pile of debris. The bars 12 are then brought towards each other, so that the carrier forms a frusto-conical configuration which encompasses a quantity of lawn debris. The individual then lifts the carrier with its load of debris for transporting to a location for disposal. When the carrier 10 is being transported, the bars 12 are held upright, so that the narrow end edge 24 is down. The conical shape of the carrier 10, when enclosing a quantity of lawn debris, restricts downward movement of the debris so that the lawn debris is effectively wedged within the conical shape of the carrier. Therefore, the individual need only exert minimal effort to maintain the debris within the carrier.

Figure 1:
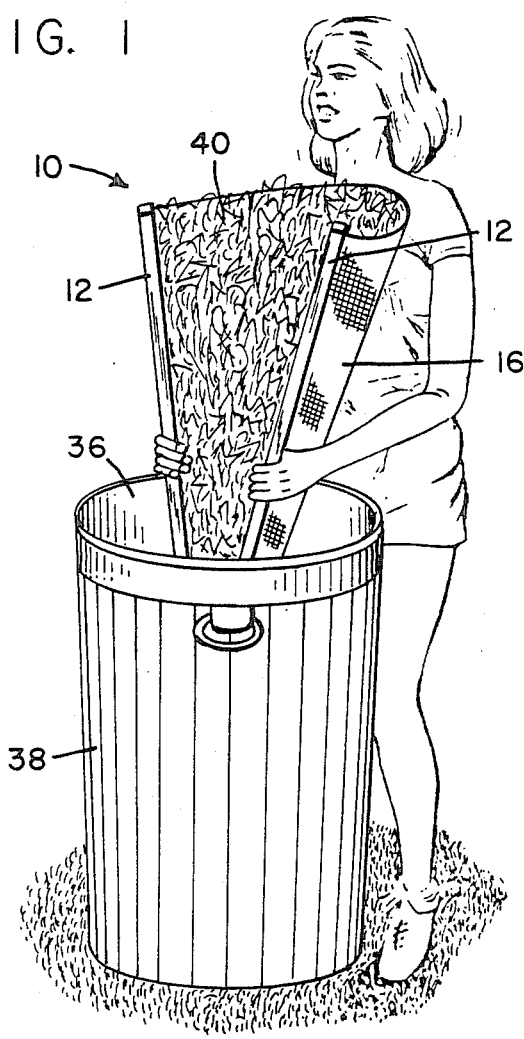
FIG. 1 is a perspective view of a pick-up device embodying the principles of the present invention and shown in use.

Referring particularly to FIG. 1, the conical shape of the carrier 10, when containing a quantity of lawn debris, enables the carrier to be inserted easily, at least partially, into a trash container, such as the trash can 38 which is shown in FIG. 1. The frusto-conical configuration of the carrier 10 at the time of transfer of trash into a trash container includes a minor diameter which is substantially less than the access opening of the container, such as the opening 36 of the trash can 38 as shown in FIG. 1. Although a trash can is shown in FIG. 1, the invention can also be used with a trash bag in which the open end of the bag is held open by another individual or mounted in a conventional supporting frame. After the small end of the carrier 10 is partially inserted into the trash container, the individual relaxes his or her grip on the bars 12 and allows the lawn debris, which is indicated by the reference numeral 40, to fall into the trash receptacle. At this step of the operation, the carrier 10 functions as a guide chute for the debris 40 so that spillage of debris outside of the trash container is held to an absolute minimum. The conical configuration of the carrier 10 is determined by the angularity of the rigid bars 12. If the angularity between the bars 12 is too small, the clamping effectiveness of the carrier 10 is reduced along with a reduction in the ease of inserting the smaller end of the carrier into a trash receptacle. If the angle between the bars 12 is too great, then there is a loss in debris carrying capacity as well as making it more difficult to release the debris into the trash receptacle. The most effective range of angles between the bars 12 when a carrier 10 is in the open position as shown in FIG. 2 is between 7° and 17° with 12° being ideal.

It is obvious that minor changes may be made in the form and construction of the invention without the departing from the material spirit thereof. It is not, however, desired to confine the invention to the exact form herein shown and described, but it is desired to include all such as properly as properly come within the scope claimed The invention having been thus described, what is claimed as new and desired to secure by Letters Patent is:

1. A pick-up and carrier device for particulate material, comprising:
   (a) a first elongated rigid bar having a first end and a second end,
   (b) a second elongated rigid bar having a first end and a second end, and
   (c) a sheet of planar flexible material having a first side edge which is attached to said first bar, a second side edge which is attached to said second bar, a first end edge which extends between the first ends of said first and second bars, and a second end edge which extends between the second ends of said first and second bars, said second end edge being substantially shorter than said first end edge so that when said sheet is fully extended and said first and second bars and said sheet lie in the same plane, said first and second bars taper toward each other from said first ends to said second ends at an angle of between 7° and 17° to define a trapezoid, so that when said bars are brought together to enclose a quantity of particulate material, said device assumes a frusto-conical shape having an open large diameter end and an open small diameter end, whereby said device is utilized for picking up a quantity of particulate material by placing said device in the fully extended state on a quantity of particulate material and bringing said rigid bars toward each other to enclose said material, whereby said device is utilized for carrying said particulate material by holding said device so that said small diameter end is down while continuing to urge said rigid bars toward each other and, whereby said device is utilized for disposing of said paritculate material by holding said device over a disposal site so that said small diameter end is down and moving said bars away from each other to allow said particulate material to funnel down to said disposal site.

2. A pick-up and carrier device as recited in claim 1, wherein said first bar is an angle of 12° with respect to said second bar.

3. A pick-up and carrier device as recited in claim 2, wherein each of said bars comprises:
   (a) a first longitudinal portion having a first longitudinal surface,
   (b) a second longitudinal portion having a second longitudinal surface which is complementary to and opposed to said first longitudinal surface and wherein said sheet of planar flexible material is adapted to extend between said first and second longitudinal surfaces, and
   (c) means for fastening said first longitudinal portion to said second longitudinal portion so that said first surface is urged toward said second surface for clamping said sheet between said first and second portions.

4. A pick-up and carrier device as recited in claim 3, wherein each of said first and second portions is rectangular in cross-section and each of said first and second surfaces is flat.

* * * * *